(12) United States Patent
Homan et al.

(10) Patent No.: US 6,788,065 B1
(45) Date of Patent: Sep. 7, 2004

(54) SLOTTED TUBULARS FOR SUBSURFACE MONITORING IN DIRECTED ORIENTATIONS

(75) Inventors: Dean Homan, Sugar Land, TX (US); Dzevat Omeragic, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 91 days.

(21) Appl. No.: 09/689,574

(22) Filed: Oct. 12, 2000

(51) Int. Cl.$^7$ ................................................. G01V 3/30
(52) U.S. Cl. ....................................................... 324/338
(58) Field of Search ........................ 324/338, 339–341, 324/343

(56) References Cited

U.S. PATENT DOCUMENTS

| | | | |
|---|---|---|---|
| 3,551,797 A | * 12/1970 | Gouilloud | 324/338 |
| 4,360,777 A | 11/1982 | Segesman | |
| 4,536,714 A | * 8/1985 | Clark | 324/338 |
| 4,899,112 A | * 2/1990 | Clark et al. | 324/338 |
| 4,949,045 A | 8/1990 | Clark et al. | |
| 5,157,605 A | * 10/1992 | Chandler et al. | 324/335 |
| 5,233,304 A | 8/1993 | Hubans | |
| 5,461,594 A | 10/1995 | Mougenot et al. | |
| 5,467,823 A | 11/1995 | Babour et al. | |
| 5,508,616 A | * 4/1996 | Sato et al. | 324/343 |
| 5,530,358 A | * 6/1996 | Wisler et al. | 324/338 |
| 5,594,343 A | * 1/1997 | Clark et al. | 324/334 |
| 5,642,051 A | 6/1997 | Babour et al. | |
| 5,829,520 A | 11/1998 | Johnson | |
| 5,939,885 A | * 8/1999 | McClure et al. | 175/50 |
| 5,992,519 A | 11/1999 | Ramakrishnan et al. | |
| 6,023,445 A | 2/2000 | Cook et al. | |
| 6,100,696 A | * 8/2000 | Sinclair | 324/338 |
| 6,163,155 A | * 12/2000 | Bittar | 324/338 |
| 6,181,138 B1 | * 1/2001 | Hagiwara et al. | 175/50 |
| 6,297,639 B1 | * 10/2001 | Clark et al. | 324/338 |
| 6,304,086 B1 | * 10/2001 | Minerbo et al. | 324/338 |
| 6,344,746 B1 | * 2/2002 | Chunduru et al. | 324/335 |
| 6,351,127 B1 | * 2/2002 | Rosthal et al. | 324/338 |

FOREIGN PATENT DOCUMENTS

| | | |
|---|---|---|
| EP | 0 964 134 A2 | 12/1999 |
| GB | 2 364 391 A | 1/2002 |
| WO | WO 00/00850 | 1/2000 |
| WO | WO 00/00851 | 1/2000 |
| WO | WO 00/00852 | 1/2000 |

OTHER PUBLICATIONS

Combined Search and Examination Report for GB 0120510.3 dated Jun. 5, 2002.

* cited by examiner

*Primary Examiner*—Jay Patidar
(74) *Attorney, Agent, or Firm*—Victor H. Segura; Brigitte L. Echols; John Ryberg

(57) ABSTRACT

Tubulars for monitoring subsurface reservoir characteristics in directed orientations. Elongated tubulars for permanent subsurface disposal are equipped with antennas adapted to transmit or receive electromagnetic energy. A tilted antenna is disposed within a groove on the tubular exterior. The groove includes a sealed opening to allow for passage of electromagnetic energy therethrough and the antenna is disposed within the groove in alignment with the opening such that the antenna is substantially perpendicular to the opening at the intersection. Methods for subsurface reservoir monitoring using the tubulars are also presented.

29 Claims, 14 Drawing Sheets

Fig. 5B
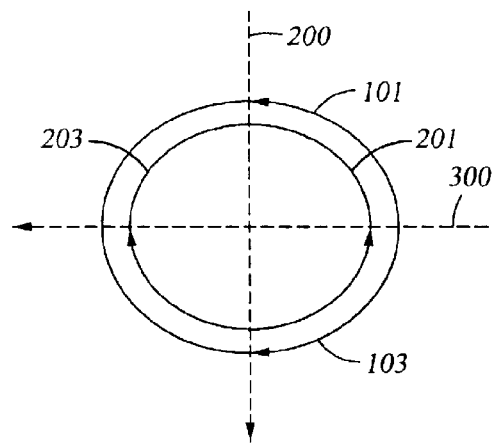
Fig. 5C
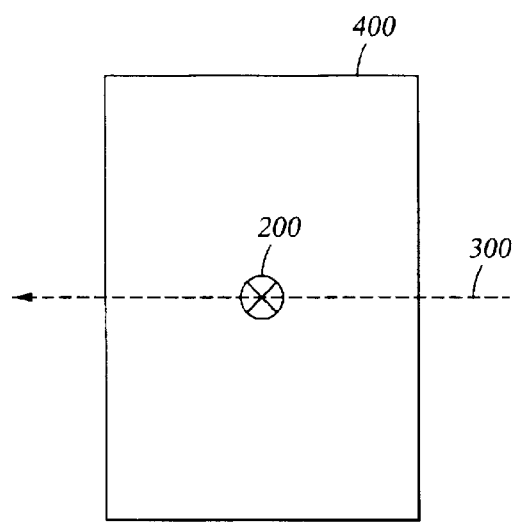
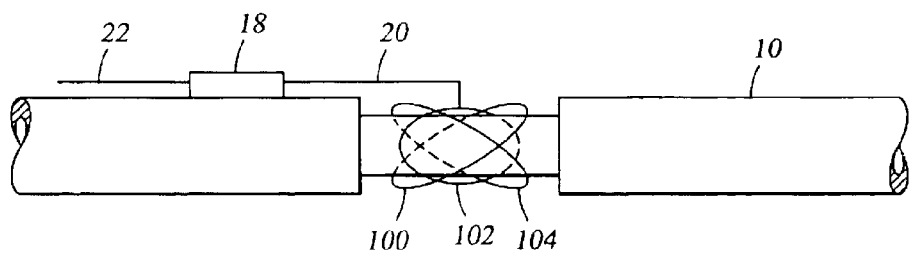
Fig. 6

SLOTTED TUBULARS FOR SUBSURFACE MONITORING IN DIRECTED ORIENTATIONS

BACKGROUND OF THE INVENTION

1. Field of the Invention

The invention relates to techniques for monitoring and surveying a subsurface reservoir penetrated by a well. More particularly, the invention concerns a method, and a device for its implementation, in which a tubular adapted for permanent disposal is deployed in a borehole. One or more antennas are disposed on the tubular to measure the reservoir properties in a desired direction by selectively steering the sensing direction of electromagnetic energy transmitted and/or received by the antenna(s) and by disposing an antenna on the tubular such that its axis is tilted with respect to the axis of the tubular. The invention has a particularly advantageous application in the collection of information on the displacement of hydrocarbons and water in a subsurface reservoir.

2. Description of Related Art

Petroleum is usually produced from oil reservoirs sufficiently far below a gas cap and above an aquifer. As the oil zone is being produced and depleted, the gas cap starts coning downward and the aquifer coning upwards towards the oil bearing zone. Such migration can adversely affect the extraction of petroleum by creating pockets that are missed by the producer and by saturating the oil deposits with water. As soon as either gas or water hits the well, its oil production usually ceases instantly.

Reservoir monitoring includes the process of acquiring reservoir data for purposes of reservoir management. Permanent monitoring techniques are used for long-term reservoir management. In permanent monitoring, sensors are permanently implanted in communication with the reservoir to be managed. For example, in one approach, sensors are permanently situated inside the casing to measure phenomena inside the well such as fluid flow rates or pressure. U.S. Pat. No. 5,467,823 (assigned to the present assignee) describes a technique for monitoring the pressure of the fluid in the reservoir. EP 0964134 A2 describes a power and signal transmission technique for permanent downhole installations using casing with external reservoir sensors.

Reservoirs are also monitored for changes in saturation and early signatures of coning so that corrective action can be taken. Measuring the electrical resistivity (or its inverse, conductivity) of the formations surrounding a borehole has been used to determine production zones in oil and gas fields and to map sand and shale layers. Electrical resistivity depends directly on porosity, pore-fluid resistivity, and saturation. Porous formations having high resistivity generally indicate the presence of hydrocarbons, while low-resistivity formations are generally water saturated.

U.S. Pat. No. 5,642,051 (assigned to the present assignee) describes a technique incorporating electrodes mounted on the casing exterior to pass a current through the reservoir to measure its electrical resistivity. U.S. Pat. No. 5,992,519 (assigned to the present assignee) describes a technique for active or automated control of a reservoir using a combination of valves and sensors disposed in the wellbore. U.S. Pat. No. 6,023,445 describes a technique for monitoring contact levels of fluids in an oil reservoir. The technique of the '445 patent uses a wireline tool disposed in a monitoring well to take acoustic measurements. U.S. Pat. No. 5,829,520 describes a technique for monitoring a reservoir using an extendable sensor attached to a tubular. U.S. Pat. No. 5,461,594 describes a method for monitoring the displacement of fluids in a reservoir using receivers disposed in a wellbore to detect seismic signals. A primary disadvantage of all these techniques is the inability to steer or focus the measurement of the reservoir property to a specifically desired region.

Thus, there remains a need for an improved method and apparatus for monitoring reservoir properties. It is desirable to implement a technique that provides for long-term selective focusing or steering of reservoir measurements without affecting production.

SUMMARY OF THE INVENTION

The invention provides an apparatus for monitoring a characteristic of a reservoir. The apparatus includes a tubular having an elongated body with a longitudinal axis. The tubular is adapted for permanent disposal within a borehole traversing the reservoir. At least one antenna is disposed on the exterior of the tubular, each antenna having an axis and being adapted for transmission and/or reception of electromagnetic energy. The antenna is disposed on the tubular such that its axis is tilted with respect to the axis of the tubular, and means to activate the antenna to transmit and/or receive electromagnetic energy are provided.

The invention provides another apparatus for monitoring a characteristic of a reservoir. The apparatus includes a tubular having an elongated body with a longitudinal axis. The tubular is adapted for permanent disposal within a borehole traversing the reservoir. An antenna is disposed on the exterior of the tubular, the antenna being adapted to transmit and/or receive electromagnetic energy. Means to activate the at least one antenna to selectively steer the sensing direction of the transmitted and/or received electromagnetic energy are also provided.

The invention provides another apparatus for monitoring a characteristic of a reservoir. The apparatus includes a tubular having an elongated body with a longitudinal axis. The tubular is adapted for permanent disposal within a borehole traversing the reservoir and has at least one slot formed along its elongated body. At least one antenna is disposed on the exterior of the tubular, each antenna having an axis and being adapted for transmission and/or reception of electromagnetic energy. At least one antenna is disposed on the tubular in alignment with a slot, and means to activate at least one antenna to transmit and/or receive electromagnetic energy are provided.

The invention provides another apparatus for monitoring a characteristic of a reservoir. The apparatus includes a tubular having an elongated body with a longitudinal axis. The tubular is adapted for permanent disposal within a borehole traversing the reservoir. At least one saddle coil is disposed on the exterior of the tubular, each saddle coil is adapted for transmission and/or reception of electromagnetic energy, and means to activate the saddle coil to transmit and/or receive electromagnetic energy are provided.

The invention also provides a method for monitoring a reservoir characteristic, the reservoir being traversed by a borehole. The method includes disposing a tubular within the borehole, the tubular having an elongated body with a longitudinal axis. The tubular is adapted for permanent disposal within the borehole and has at least one antenna disposed on its exterior, each antenna having an axis and being adapted for transmission and/or reception of electromagnetic energy. The method also includes disposing the antenna on the tubular such that its axis is tilted with respect to the axis of the tubular, and activating the antenna to transmit and/or receive electromagnetic energy.

The invention provides another method for monitoring a characteristic of a reservoir, the reservoir being traversed by a borehole. The method includes disposing a tubular within the borehole. The tubular having an elongated body with a longitudinal axis and adapted for permanent disposal within the borehole. The method also includes disposing an antenna on the exterior of the tubular, the antenna being adapted to transmit and/or receive electromagnetic energy; and selectively steering the sensing direction of the transmitted and/or received electromagnetic energy.

The invention provides another method for monitoring a reservoir characteristic, the reservoir being traversed by a borehole. The method includes disposing a tubular within the borehole, the tubular having an elongated body with a longitudinal axis. The tubular is adapted for permanent disposal within the borehole and has at least one slot formed along its elongated body with at least one antenna disposed on the exterior of the tubular in alignment with a slot, each antenna is adapted for transmission and/or reception of electromagnetic energy. The method also includes activating the antenna to transmit and/or receive electromagnetic energy.

The invention provides another method for monitoring a characteristic of a reservoir, the reservoir being traversed by a borehole. The method includes disposing a tubular within the borehole. The tubular has an elongated body with a longitudinal axis and is adapted for permanent disposal within the borehole. The tubular has at least one saddle coil disposed on its exterior; each saddle coil is adapted for transmission and/or reception of electromagnetic energy. The method also includes activating the saddle coil to transmit and/or receive electromagnetic energy.

BRIEF DESCRIPTION OF THE DRAWINGS

Other aspects and advantages of the invention will become apparent upon reading the following detailed description and upon reference to the drawings in which:

FIGS. 5a–5c illustrate alternative antenna configurations in accord with the invention.

FIG. 6 is a schematic diagram of a tubular with an electronics enclosure and an antenna in accord with the invention.

DETAILED DESCRIPTION OF SPECIFIC EMBODIMENTS

Figure 1:
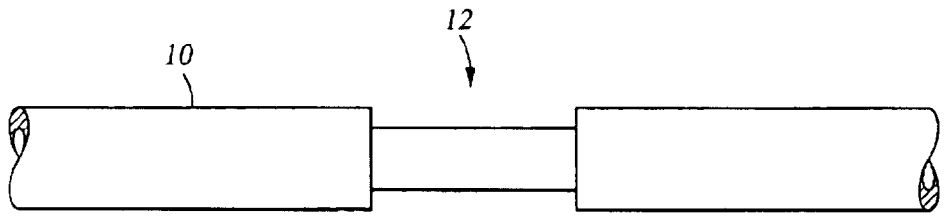
FIG. 1 is a schematic diagram of a tubular with a recessed station in accord with the invention.

FIG. 1 shows a tubular 10 embodiment of the invention. A groove is machined about the external circumference of a conventional casing tubular 10, typically made of steel pipe, such that the tubular 10 has a small section with a reduced diameter, thereby forming a recess 12. The recess 12 may be formed in the tubular 10 by machining processes as known in the art or by other suitable means. The depth of the recess 12 may vary depending on the wall thickness of the tubular 10. An exemplary recess 12 may be approximately ⅛-inch deep. The length and diameter of the tubular 10 may also vary as desired. Conventional casing tubulars have an out-side diameter ranging from 4.5 to 20 inches and lengths between 16 to 48 feet.

Figure 2:
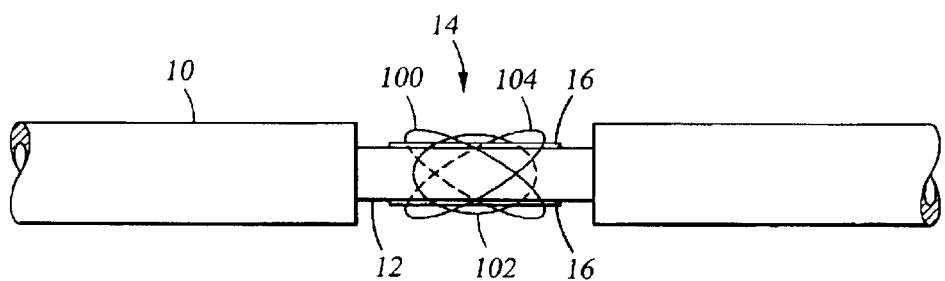
FIG. 2 is a schematic diagram of a tubular with an antenna disposed within a recessed station in accord with the invention.

FIG. 2 shows an embodiment of the invention. An antenna 14 is disposed within a recess 12 in the tubular 10. In this particular embodiment, the antenna 14 array includes a triad of coils 100, 102, 104 wrapped around the tubular 10. The antenna 14 array is preferably disposed within a recess 12 in the tubular 10, leaving no radial profile to hinder the placement of the tubular 10 within the borehole. The coils of the antenna array are generally of the cylindrical solenoid type and are comprised of one or more turns of insulated conductor wire that is wound around the tubular 10 as known in the art. The exterior mounting of the antenna 14 array also leaves the inner bore of the tubular unobstructed. Alternatively, the antenna 14 array may be wrapped on a non-recessed segment of the tubular if desired (not shown).

A layer of an electrically insulating material 16, (e.g., Randallite, fiberglass-epoxy, or rubber) is placed between the coils 100, 102, 104 and the body of the tubular 10. The entire recess 12 may be filled with the insulating material so that the antenna 14 array is sealed or potted within the recess 12. In an alternative embodiment, where the tubular is already insulated or formed of a non-conductive material (e.g., fiberglass), the antenna(s) may be directly mounted onto the tubular and sealed with a rubber over-molding (not shown). Nevertheless, it is preferable to maintain a gap or spacing between the coils 100, 102, 104 and the tubular 10.

Figure 3:
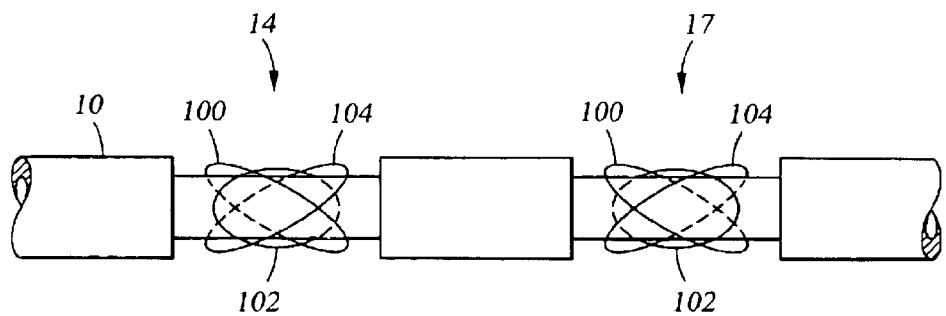
FIG. 3 is a schematic diagram of a tubular with two antennas disposed within recessed stations in accord with the invention.

FIG. 3 shows another embodiment of the invention. As known in the art, when the coils 100, 102, 104 are energized with an alternating current to transmit electromagnetic energy (EM), an oscillating magnetic field is produced, resulting in the induction of currents in the surrounding formation which are nearly proportional to its conductivity. These currents, in turn, contribute to the voltage induced at a second antenna 17 array used as a receiver. The receiver antenna 17 array may also be placed within a second recess 12 or at a non-recessed segment of the tubular 10 as desired. While the coils of either antenna are preferably mounted on the tubular 10 such that their axes are mutually orthogonal, the invention may also be implemented with the coils having their axes at varying angles relative to one another.

An aspect of the invention involves electronically "steering" the direction of the magnetic moment resulting from the magnetic field components generated by the transmitter antenna 14 array. A further aspect of the invention involves steering at the receiver antenna 17 array by controlling the relative sensitivities of sensing means that are coupled to the coils 100, 102, 104 forming the receiver antenna 17 array. Before proceeding with disclosure of the invention, some theoretical considerations shall be set forth.

Figure 4:
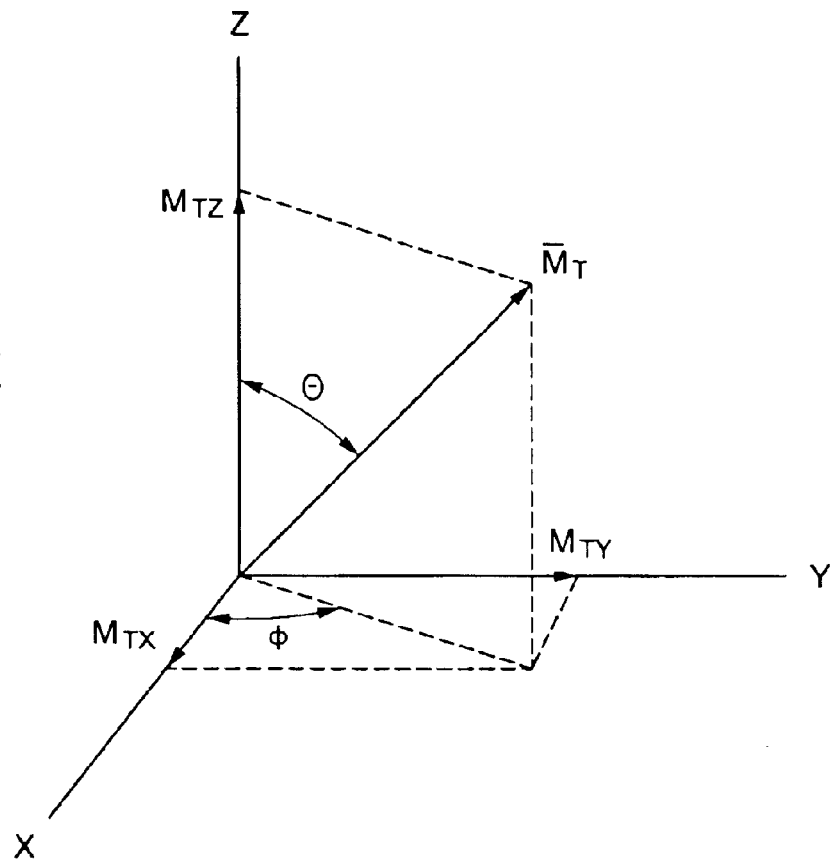
FIG. 4 illustrates a set of magnetic moment vectors with a resultant moment that is obtainable with the embodiments of the invention.

A coil carrying a current can be represented as a magnetic dipole having a magnetic moment proportional to the current. The direction and strength of the magnetic moment can be represented by a vector perpendicular to the plane of the coil. Corresponding magnetic moment vectors can represent three such coils with non-parallel axes (such as the antennas in FIGS. 2 and 3). By combining vectors of appropriate magnitudes, one can obtain a resultant magnetic moment vector designated $\overline{M}_T$, in any desired direction and magnitude. Thus, by passing currents of appropriate relative magnitudes through three non-parallel coils, one can obtain a magnetic field that is theoretically equivalent to the magnetic field of a single coil with any desired orientation. Reference is made, for example, to FIG. 4, which illustrates magnetic moments designated $\overline{M}_{TX}$, $\overline{M}_{TY}$, and $\overline{M}_{TZ}$, and a resultant magnetic moment $\overline{M}_T$, which is at a (tilt) angle $\theta$ with respect to the z axis and which has a projection on the xy plane at an (azimuthal) angle $\phi$.

Directionality can also be attributed to the receiver antenna 17 array as follows: If the sensitivities (or amplification factors) of the circuits coupled to individual coils 100, 102, 104 are appropriately selected, the resultant of the signals induced in the three non-parallel coils can be steered to any desired direction. For example, one could consider each of the receiver coils as having a coil moment represented as a vector. The magnitude of the coil moment for each individual coil is proportional to the product of the number of turns times the cross-sectional area of the turns times the adjustable sensitivity (or amplification) attributable to the coil. A receiver coil moment vector, $\overline{M}_R$ can be considered as being made up of the sum of three coil moment components designated $\overline{M}_{RX}$, $\overline{M}_{RY}$, and $\overline{M}_{RZ}$, which correspond to the contributions from three coils having axes in the x, y, and z directions. Additional description of the directionality obtained with the coil arrays of the invention may be found in U.S. Pat. No. 4,360,777 (assigned to the present assignee), incorporated herein by reference.

Figure 5A:
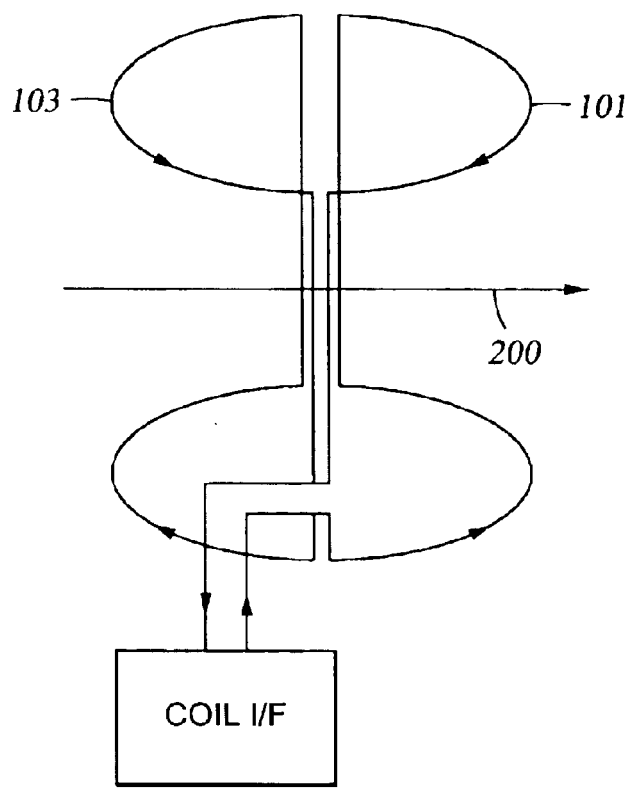

FIGS. 5a–5c are diagrammatic views of alternate antenna embodiments of the invention employing a transverse coil configuration using one or more saddle coils. Referring to FIG. 5a, a first antenna embodiment is illustrated having segmented coils 101 and 103. These segmented coils together produce a magnetic dipole 200 that extends radially from the tubular (not shown) in which the segmented coils are mounted. As is generally illustrated, the segmented coils 101, 103 are formed to extend about the circumference of a cylindrical portion of the tubular and to receive current out of phase with respect to each other. Alternatively, the segmented coils 101, 103 may be independently disposed on a tubular and energized to produce the desired magnetic dipole.

Turning to FIG. 5b, another antenna embodiment of the invention includes a second set of half-coils 201, 203 that orient and receive current so as to produce a magnetic dipole 300 that also extends radially from the tubular in which the half-coils are mounted. Half-coils 101 and 103 are overlaid to surround half-coils 201 and 203. The half-coils 201, 203 are disposed on the tubular to produce the magnetic dipole 300 so that dipole 300 is rotated azimuthally with respect to the magnetic dipole 200. FIG. 5c further illustrates the orientation of these magnetic dipoles 200, 300. These magnetic dipoles 200 and 300, disposed within the borehole 400, are controllable so that the measurement sensitivity may be directed axially from the tubular at any azimuth angle.

The steerable antenna 14, 17 arrays are electronically controlled so that the direction of the resultant radiation pattern maximum may be controlled. The tubulars 10 of the invention include a fluid-tight enclosure 18, which contains electronic circuitry, this circuitry being shown in block form at the side of the tubular 10 in FIG. 6. The circuitry enclosure 18 may be affixed to the exterior of the tubular by suitable means as known on the art, including spot welding, fastener means, and straps (not shown). Alternatively, the enclosure 18 may be positioned within the tubular or within a recessed 12 station if desired (not shown). The electronics for activating and steering the antennas of the invention may be configured as described in U.S. Pat. No. 4,360,777.

The antenna 14, 17 arrays are coupled to one end of the circuitry enclosure 18 by a cable 20. The cable 20 is potted within the recess 12 by the insulating material as described above. A wireline 22 is attached at the opposite end of the enclosure 18 for extension to the surface or another location.

The wireline 22 may be run externally along a groove milled in the tubular (not shown). In accordance with one embodiment, the wireline 22 may provide AC or DC power to the antennas 14, 17 arrays as well as allow the transmission of data signals from the antennas to the surface and vice-versa. The wireline 22 may also be tethered to the tubular 10 approximately every 30 feet using straps (not shown) or other suitable means as known in the art.

Conventional wells are routinely equipped with tubulars having valves and other apparatus to control flow and production. Such tubulars are equipped with batteries or other means to power these valves and apparatus. It will be appreciated by those skilled in the art that the tubulars 10 of the invention may also be equipped with these known means to power and operate the antenna 14, 17 arrays.

Alternatively, the antenna 14, 17 arrays may be powered by a run-in-tool or buoy (not shown) that is sent from the surface through the tubular 10 as known in the art. The run-in-tool or buoy may be disposed within the tubular 10 for an extended period with power fed to it through a connected wireline or by batteries housed within the tool or buoy. Signal data transfer between the antenna 14, 17 arrays and the tool or buoy may be achieved through matching inductive couplers (not shown) disposed on the tool or buoy and the tubular 10 as known in the art. It will be appreciated by those skilled in the art that other means of power and/or signal transfer between the antenna 14, 17 arrays and the surface may be implemented with the invention.

Figure 7A:
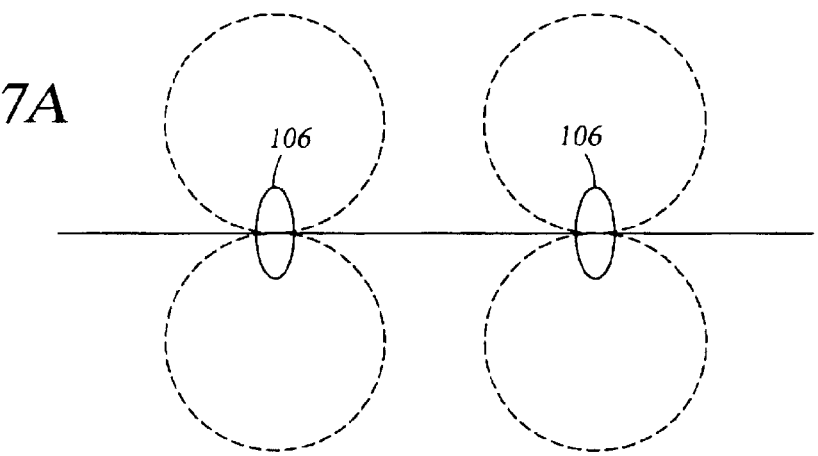
FIGS. 7a–7c are schematic diagrams of the general volumes of influence to electromagnetic energy obtained with different antenna configurations mounted along a support member.
Figure 7B:
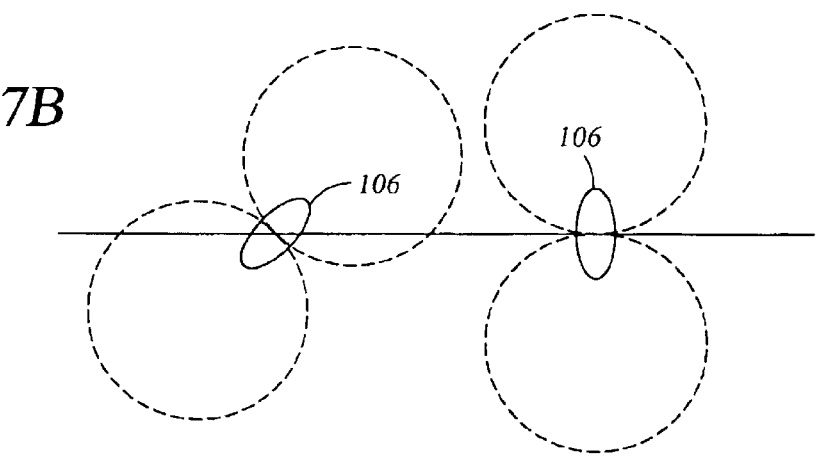
Figure 7C:
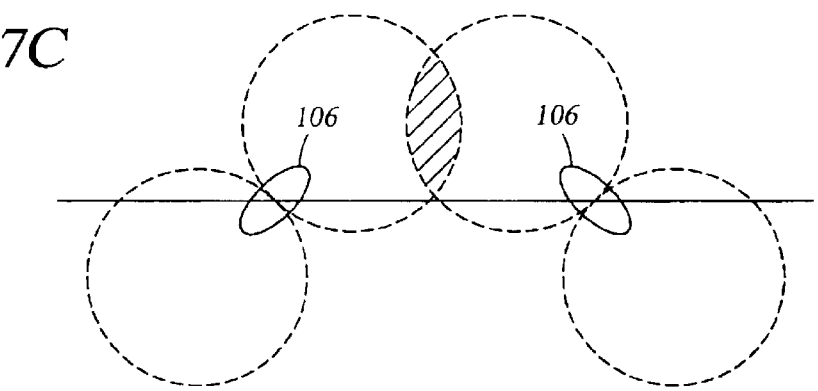

As described above, an energized transmitter antenna will irradiate the surrounding formation with EM energy. The EM energy is sensed by one or more receiver antennas on the tubular 10. FIG. 7a shows the general pattern of antenna 106 sensitivity to EM energy for a typical antenna configuration having non-tilted axes. FIG. 7b shows the general pattern of antenna 106 sensitivity for a configuration where the axis of one antenna 106 is tilted relative to the longitudinal tubular 10 axis (represented by the solid line). FIG. 7c shows the general pattern of antenna 106 sensitivity for a configuration where the axes of both antennas 106 are tilted relative to the tubular axis. Increased directionality may be achieved when one or both antennas 106 are tilted, as represented by the shaded region of overlap in FIG. 7c. FIGS. 7a–7c show that by tilting the axis of the antenna 106, the axis of its magnetic dipole is rotated, thereby altering the antenna's 106 pattern of influence to EM energy.

Figure 8:
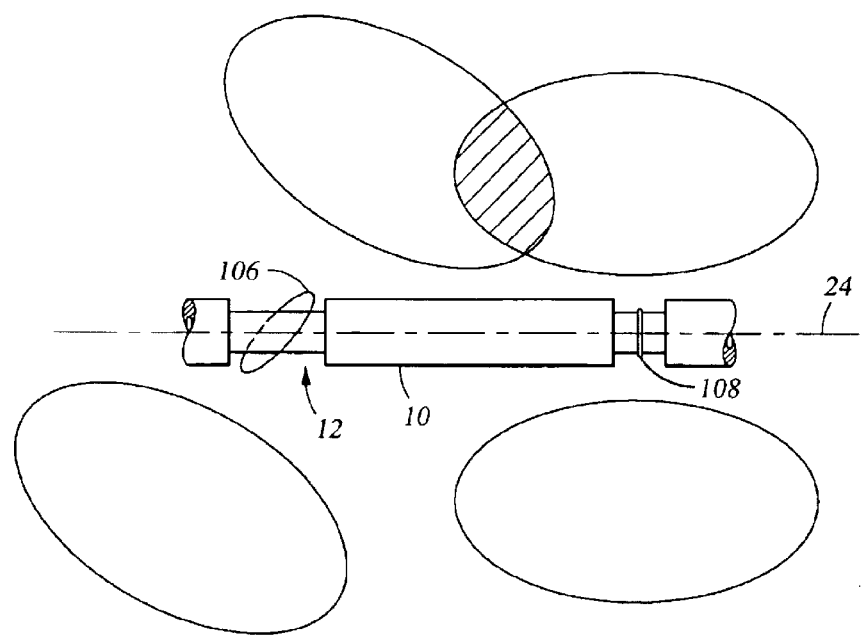
FIG. 8 is a schematic diagram of a tubular with an antenna having a tilted-axis configuration in accord with the invention.

FIG. 8 shows another embodiment of the invention. In this particular embodiment, an antenna 106 is disposed on the tubular 10 within the recess 12. The antenna 106 is tilted such that its axis, or magnetic moment, is at an angle with respect to the longitudinal axis 24 of the tubular 10. The antenna 106 is insulated from the tubular 10 and the entire recess 12 may be potted with a suitable material as described above. By transmitting EM energy from the tilted antenna 106, a nearby receiver antenna 108 may be used to measure the formation resistivity or other properties at a specific direction in the formation. The direction of maximum azimuthal sensitivity is indicated by the shaded region of overlap in FIG. 8.

Figure 9:
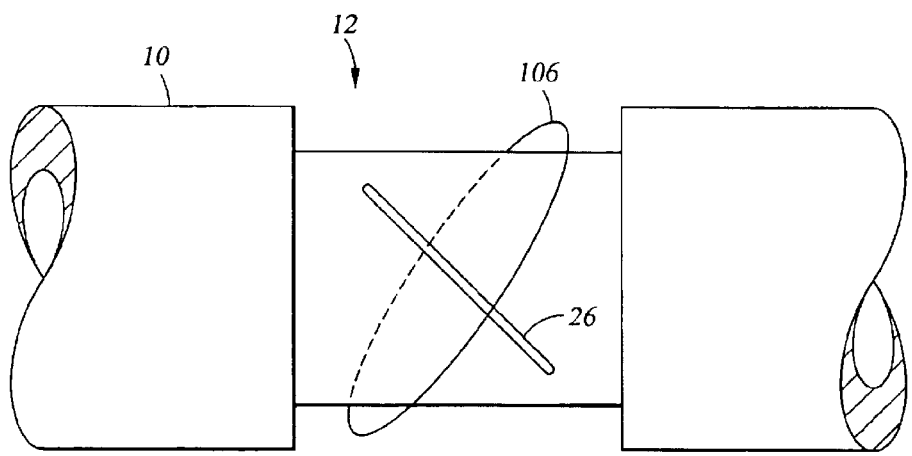
FIG. 9 is a schematic diagram of a tubular with an antenna having a tilted axis and a slotted station in accord with the invention.
Figure 18:
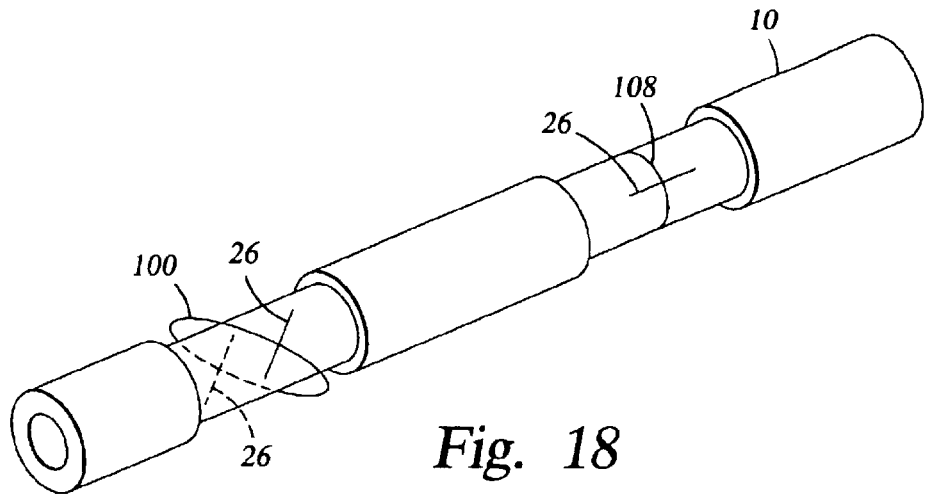
FIG. 18 is a schematic diagram of a tubular with a tilted antenna and a co-axial antenna configuration in accord with the invention.
Figure 20:
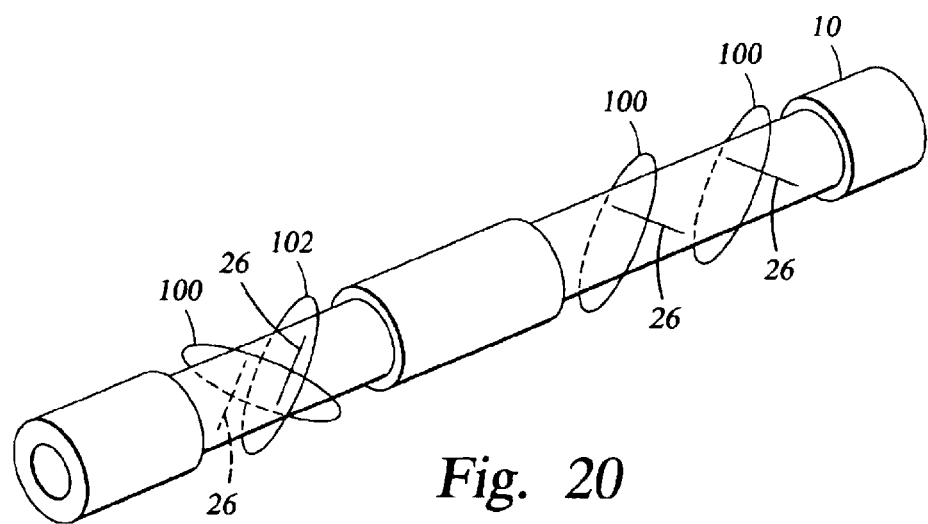
FIG. 20 is a schematic diagram of a tubular with an antenna comprising two tilted coils in one recessed station and two parallel antennas in another recessed station in accord with the invention.
Figure 23:
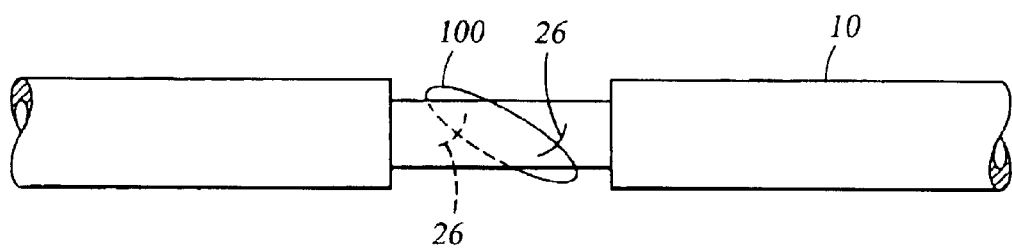
FIG. 23 is a schematic diagram of a tubular with a recessed station including curved slots in accord with the invention.

FIG. 9 shows another embodiment of the invention. In this particular embodiment, one or more slots 26 are machined into the tubular 10 to fully penetrate the wall at the recessed 12 station. An antenna 106 is disposed on the tubular 10 in alignment with the slot 26. The slot 26 is formed at an angle with respect to the longitudinal axis of the tubular 10 so that the slot 26 is preferably perpendicular to the antenna 106 at the intersection of the slot 26 and antenna 106. However, if the antenna 106 is mounted co-axially with the tubular 10, the slots 26 are preferably formed parallel to the longitudinal axis of the tubular 10 as shown in FIG. 10b. FIG. 18 shows such an embodiment with a tilted antenna 100 and a co-axial antenna 108 disposed in alignment with longitudinal slot 26. The slots 26 aid in attenuating any current flow around the metallic tubular 10 that may be generated by the current flow in the antennas 106, 108. The length and displacement of the slot(s) 26 may vary. For example, FIG. 23 shows a tubular with curved slots 26. A preferable slot 26 length is three times the extent of the wire thickness of the coil forming the antenna 106. FIG. 20 shows another embodiment including an antenna formed of two coils 100, 102 having non-parallel axes in one groove and two additional antennas 100, 100 disposed in another groove with their axes parallel to one another.

Hydraulic isolation between the interior and exterior of the tubular 10 is achieved by sealing the slot(s) 26 with Randallite, fiberglass-epoxy, rubber, or any suitable nonconductive material or compound. It will be appreciated that various other means may be used to seal the slot 26, including inserts, internal/external sleeves, and plugs (not shown).

Figure 10A:
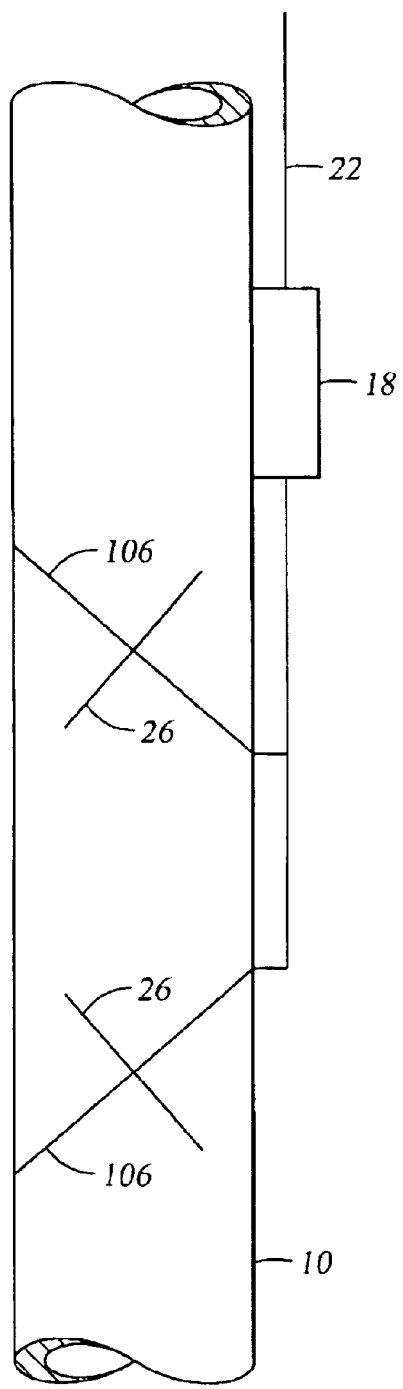
FIG. 10a is a schematic diagram of a tubular with dual tilted antennas in accord with the invention.
Figure 10B:
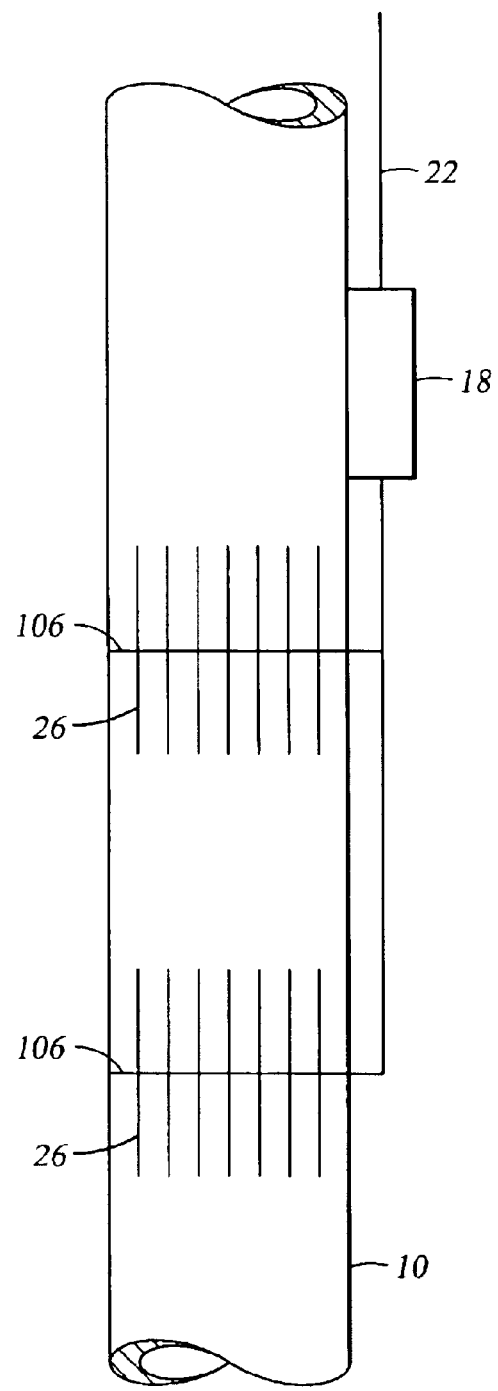
FIG. 10b is a schematic diagram of a tubular with dual axial antennas and slotted stations in accord with the invention.
Figure 19:
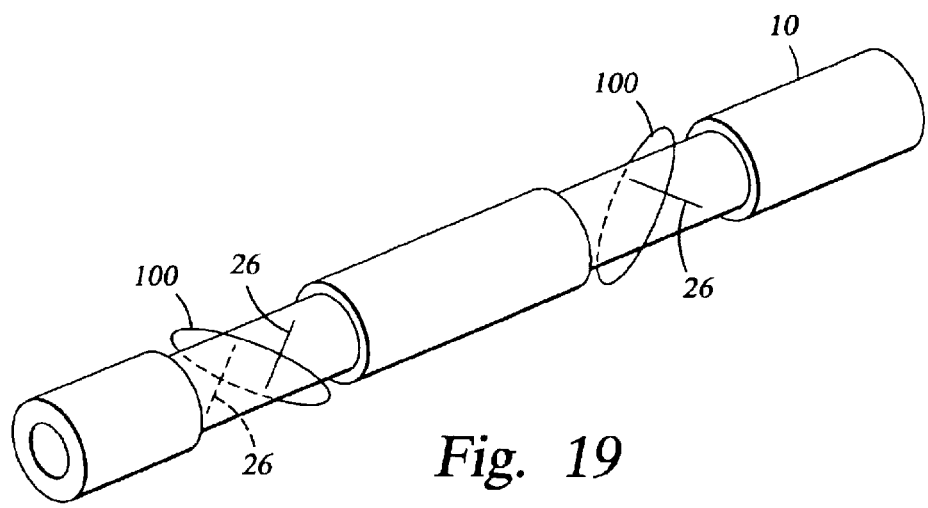
FIG. 19 is a schematic diagram of a tubular with two tilted antennas disposed in recessed stations with their axes angled toward one another in accord with the invention.

Turning to FIGS. 10a and 10b, two other embodiments of the invention are shown. Embodiment 10a includes two tilted antennas 106 disposed on the tubular 10. Each antenna 106 is positioned in alignment with a series of slots 26 formed in the tubular 10. FIG. 19 shows a similar embodiment with the tilted antennas 100 each disposed within a groove formed on the tubular 10, FIG. 10a also shows the circuitry enclosure 18 and wireline 22 positioned on the tubular 10 as described above.

FIG. 10b shows an embodiment of the invention having two antennas 106 mounted on the tubular 10 such that their axes are coaxial with the tubular 10. This configuration will provide for traditional measurement sensitivity. The antennas 106 are also shown positioned in alignment with a series of slots 26 formed in the tubular 10. The slots 26 may be sealed with a nonconductive material or compound as described above.

Figure 11A:
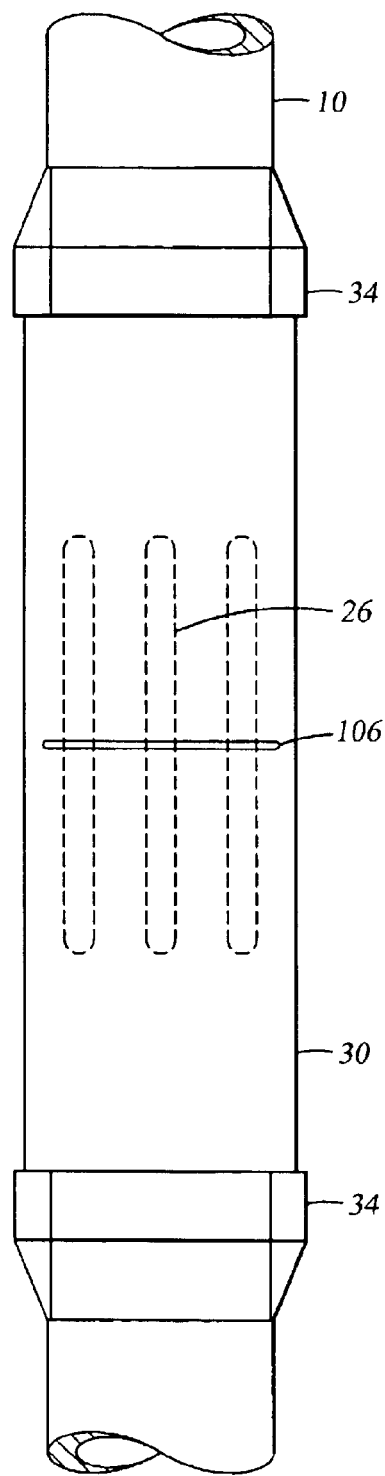
FIG. 11a is a schematic diagram of a tubular with a shield surrounding the slotted station in accord with the invention.

FIG. 11a shows another embodiment of the invention. This particular embodiment is similar to the embodiment of FIG. 10b, except that a shield 30 is placed around the recessed station. The shield 30 protects the antenna 106 from damage that may occur while the tubular 10 is placed in the reservoir. The shield 30 may be formed as a cylindrical tube or sleeve to enclose and surround the antenna 106. Protective metal upset rings 34 may be mounted on the tubular 10 above and below the shield 30 to protect the shield 30 on the trip into the well, retaining the shield 30 in position over the slotted 26 station. The upset rings 34 may be mounted on the tubular 10 in a number of ways as known in the art, e.g., spot welding or by fastener means.

The shield 30 is made of an insulating material to permit the passage of EM radiation. Useable materials include the class of polyetherketones described in U.S. Pat. No. 4,320, 224, or other suitable resins. Victrex USA, Inc. of West Chester, Pa. manufactures one type called PEEK. Cytec Fiberite, Greene Tweed, and BASF market other suitable thermoplastic resin materials. Another usable insulating material is Tetragonal Phase Zirconia ceramic ("TZP"), manufactured by Coors Ceramics of Golden, Colo. Since the tubular 10 is typically cemented into the borehole traversing the reservoir, the cement job will reinforce the integrity of the shield 30 over the recessed 12 station.

Figure 11B:
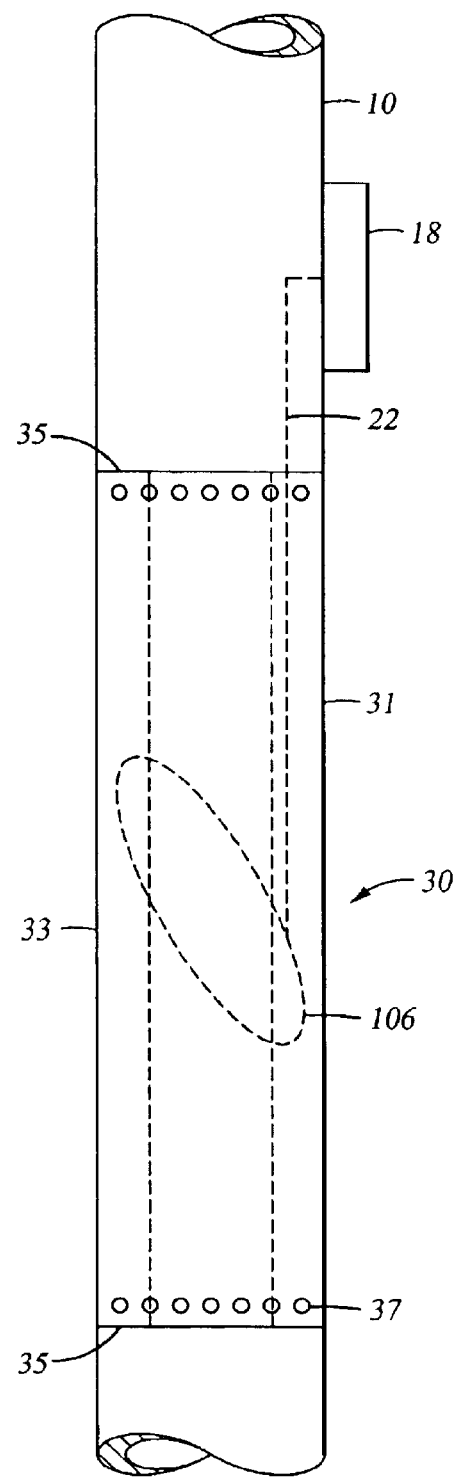
FIG. 11b is a schematic diagram of a tubular with two half-shields surrounding the recessed station in accord with the invention.

The shield 30 may also be formed of metal. FIG. 11b shows a metallic shield 30 embodiment that may be implemented with the invention. In this case, the metallic shield 30 will have one or more slots cut through its walls to permit the passage of EM energy. As shown in FIG. 11b, two half-shields 31, 33 are mounted on shoulders 35 of the recess and secured by fastening screws 37, providing a low radial profile. A layer of rubber is provided on the underside of the shield 30 and also fills the slot(s) of the shield (not shown). U.S. Pat. Nos. 4,949,045 and 4,536,714 (both assigned to the present assignee) describe a metallic shield configuration that may be used to implement the invention. Other shield embodiments may be used to implement the invention. For example, a shield 30 may be configured in the form of a strip (not shown), also referred to as flex circuit, to provide flexibility and easy mounting. It will be appreciated that every embodiment of the invention may be configured to include a shield if desired.

Figure 12:
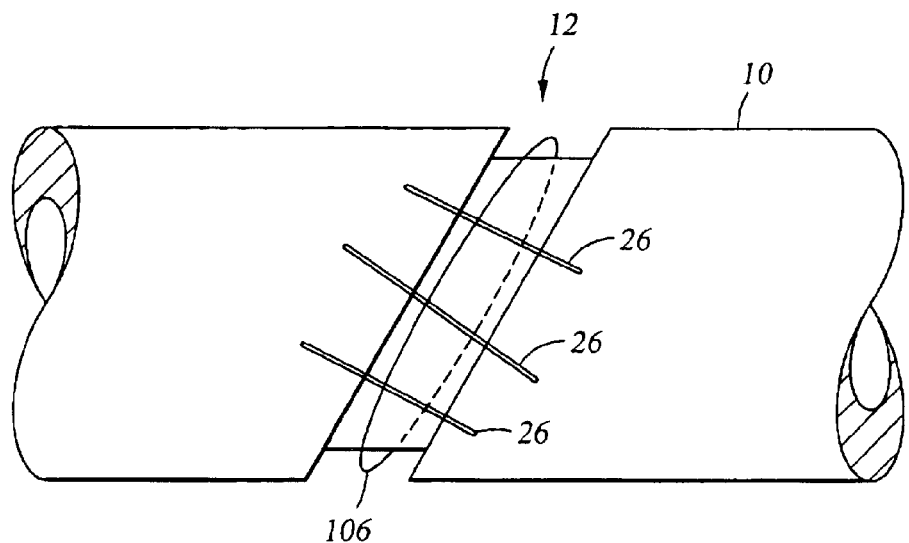
FIG. 12 is a schematic diagram of a tubular with a tilted antenna configuration in a narrowed and tilted recess in accord with the invention.
Figure 21:
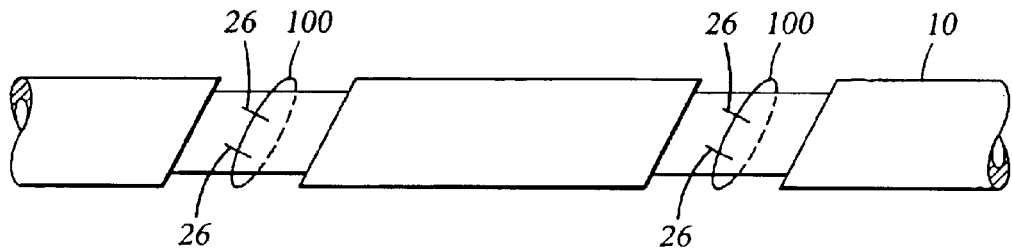
FIG. 21 is a schematic diagram of a tubular with tilted antennas disposed in parallel tilted recessed stations in accord with the invention.
Figure 22:
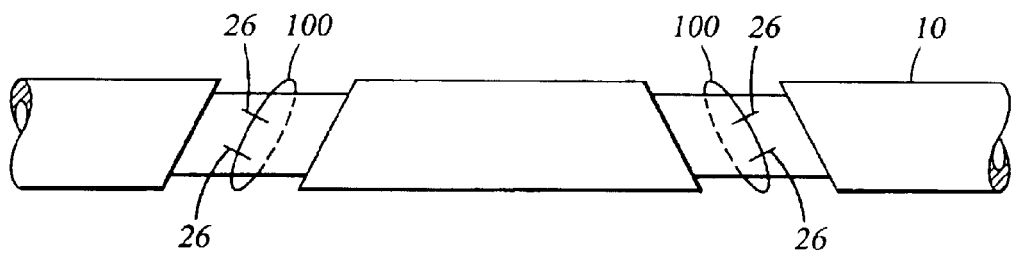
FIG. 22 is a schematic diagram of a tubular with tilted antennas disposed in tilted recessed stations angled toward one another in accord with the invention.

FIG. 12 shows another embodiment of the invention. In this particular embodiment, an antenna 106 is disposed within a narrow tilted recess 12 formed in the tubular 10. Multiple slots 26 are also provided in the tubular 10 of this embodiment. The slots 26 are sealed and the antenna 106 may be potted within the recess 12 as described above. By narrowing the recess 12, greater structural integrity of the tubular 10 is maintained. The recess 12 may be sealed with Randallite, fiberglass-epoxy, rubber, or any suitable compound permitting the passage of EM energy. FIG. 21 shows a tubular 10 embodiment with two tilted parallel recesses, each recess having a tilted antenna 100 disposed therein over slots 26. FIG. 22 shows another tubular 10 embodiment with the tilted recesses angled toward one another.

As known in the art, the tubulars 10 of the invention are typically adapted with pin and box threads at the ends for connection to other tubulars (not shown). Given the variable tubular lengths that may be used to implement the invention, a tubular 10 may be equipped with one or more antennas and coupled to a second tubular 10 incorporating one or more antennas itself. With such a configuration, a wireline could be coupled between the tubulars as known in the art, avoiding the need to run multiple wirelines to the surface.

Figure 13:
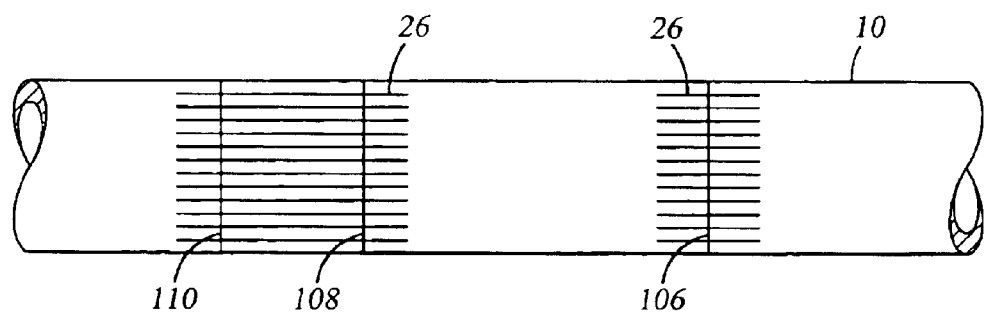
FIG. 13 is a schematic diagram of a tubular with a bucking antenna and a receiver antenna configuration for use in induction-type measurements in accord with the invention.

The antennas of the invention may be placed on the tubular 10 in various configurations and energized at various frequencies to measure the properties of a surrounding reservoir. FIG. 13 shows another embodiment of the invention. The configuration of this embodiment provides for an induction-type measurement. In addition to a transmitter 106 and receiver antenna 108, the tubular 10 also includes a "bucking" antenna 110 placed near the receiver antenna 108. As known in the art, the signals measured with induction frequencies are affected by direct transmitter-to-receiver coupling. The bucking antenna 110 is used to eliminate or reduce these coupling effects. It will be appreciated by those skilled in the art that the axial spacing and placement of the antennas 106, 108, 110 along the tubular, as well as the transmitting antenna power, may be varied to alter the signal strength and measurement sensitivity. The tubular 10 may be configured and used for induction-type measurements as described in U.S. Pat. No. 5,157,605 (assigned to the present assignee), incorporated herein by reference.

The invention may also be configured and operated to provide propagation-type measurements. As known in the art, propagation-type logging measurements involve the transmission of EM energy into the formation, where energy shed back into the borehole is measured by receivers to determine the relative attenuation and/or the phase shift of the EM energy propagating in the formation. U.S. Pat. No. 3,551,797 describes a conventional EM propagation logging technique.

Figure 14:
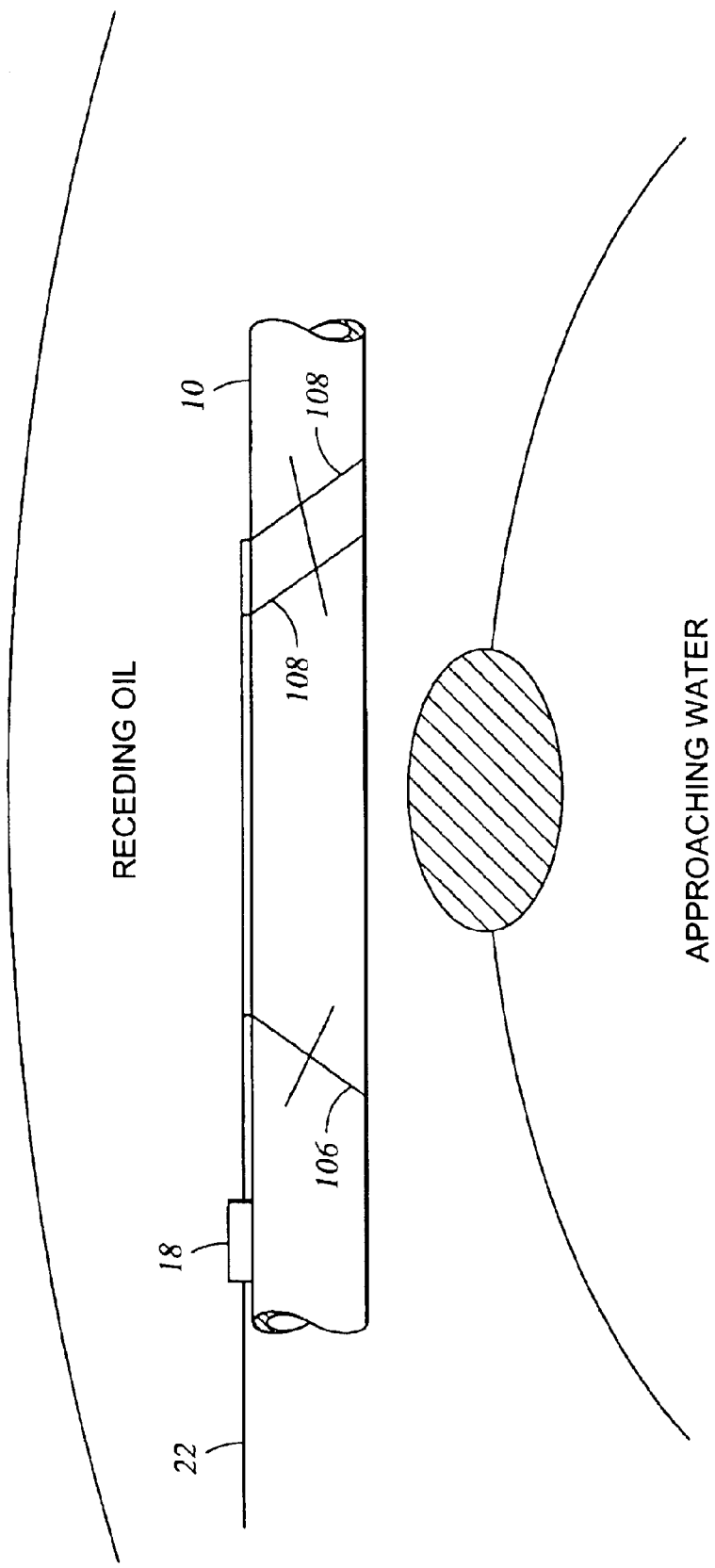
FIG. 14 is a schematic diagram of a tubular with a tilted antenna configuration for use in propagation-type and/or compensated measurements in accord with the invention.

FIG. 14 shows an embodiment of the invention that may be used for propagation-type measurements. A tubular 10 configured with a transmitter antenna 106 and two receiver antennas 108 is disposed in a horizontal well. The axes of the antennas 106, 108 are tilted with respect to the longitudinal axis of the tubular 10. As described above, this antenna geometry is azimuthally sensitive, allowing for signal measurement in a specific region or direction of interest as depicted by the shaded area in FIG. 14. This implementation could be used to monitor the approaching water from a nearby injector well. A resistivity time log would alert the engineer to make appropriate adjustments to the well to safeguard against producing water or other unwanted effects. This configuration allows one to obtain a compensated measurement as known in the art and described in U.S. Pat. Nos. 4,899,112 and 5,594,343 (both assigned to present assignee), incorporated herein by reference.

Figure 15:
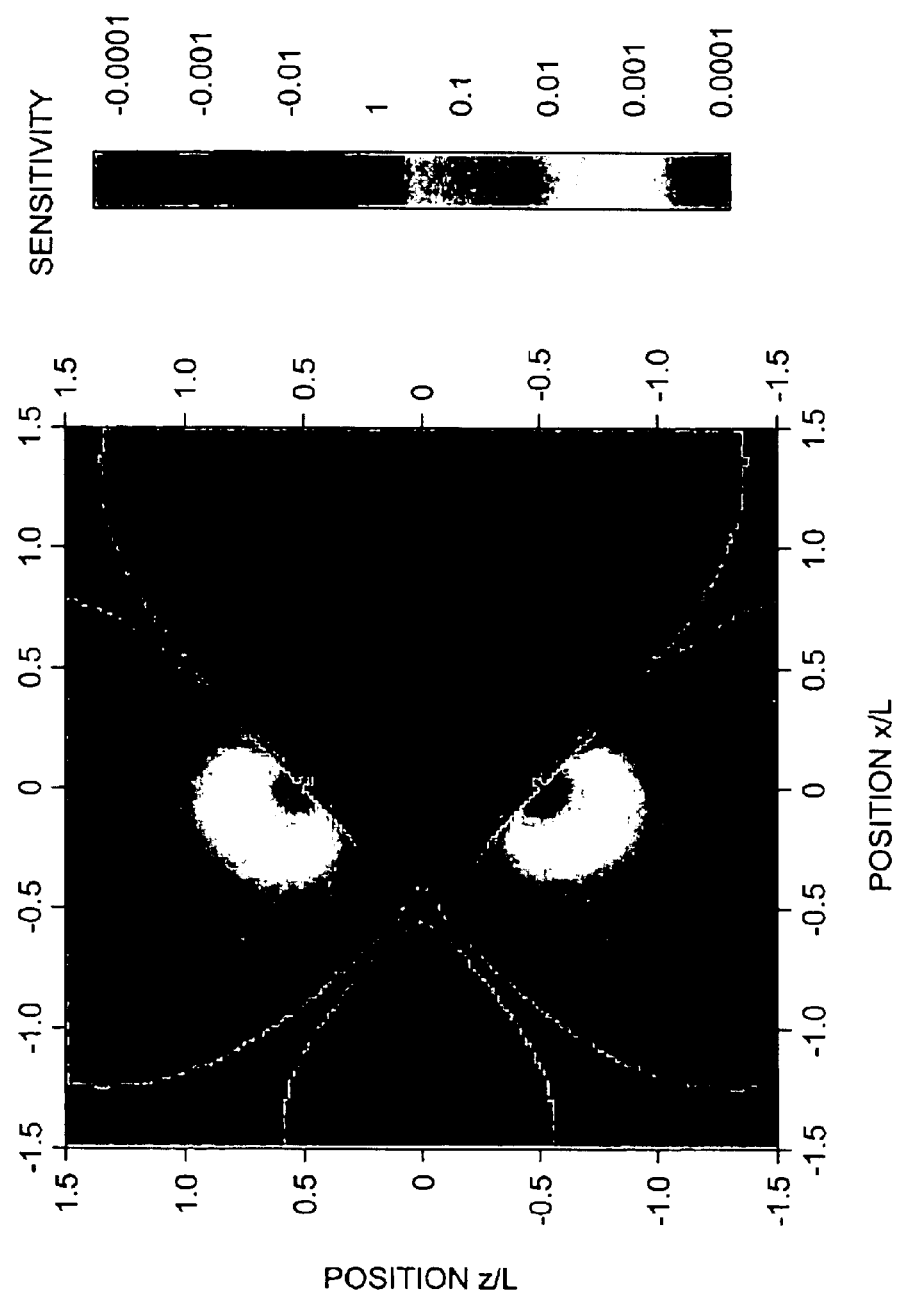
FIG. 15 is a density plot showing a three-dimensional sensitivity distribution in an X-Z plane for a tubular of the invention having transmitter and receiver antennas with axes tilted at 45°.
Figure 16:
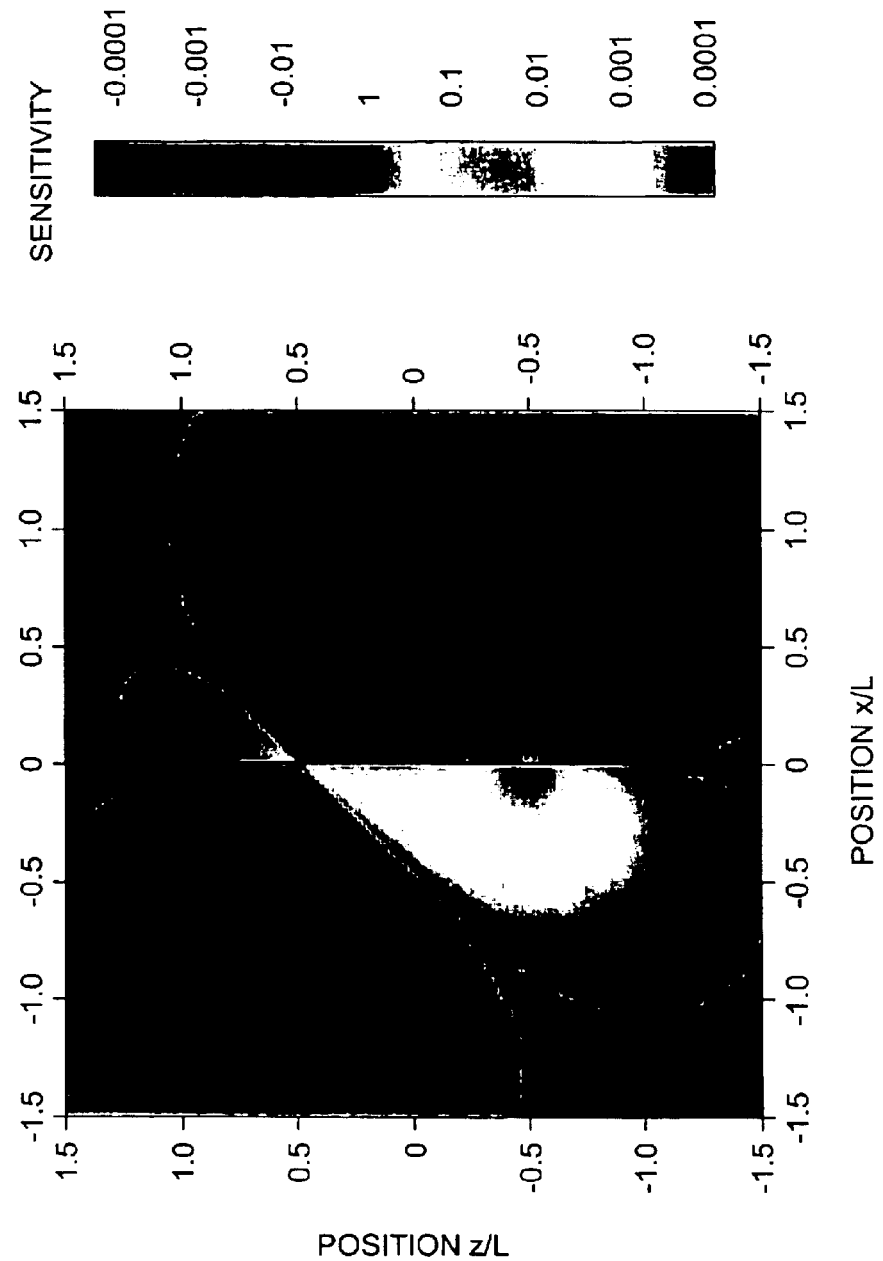
FIG. 16 is a density plot showing a three-dimensional sensitivity distribution in an X-Z plane for a tubular of the invention having a transmitter antenna with a 45°-tilted axis and an axial receiver antenna.
Figure 17:
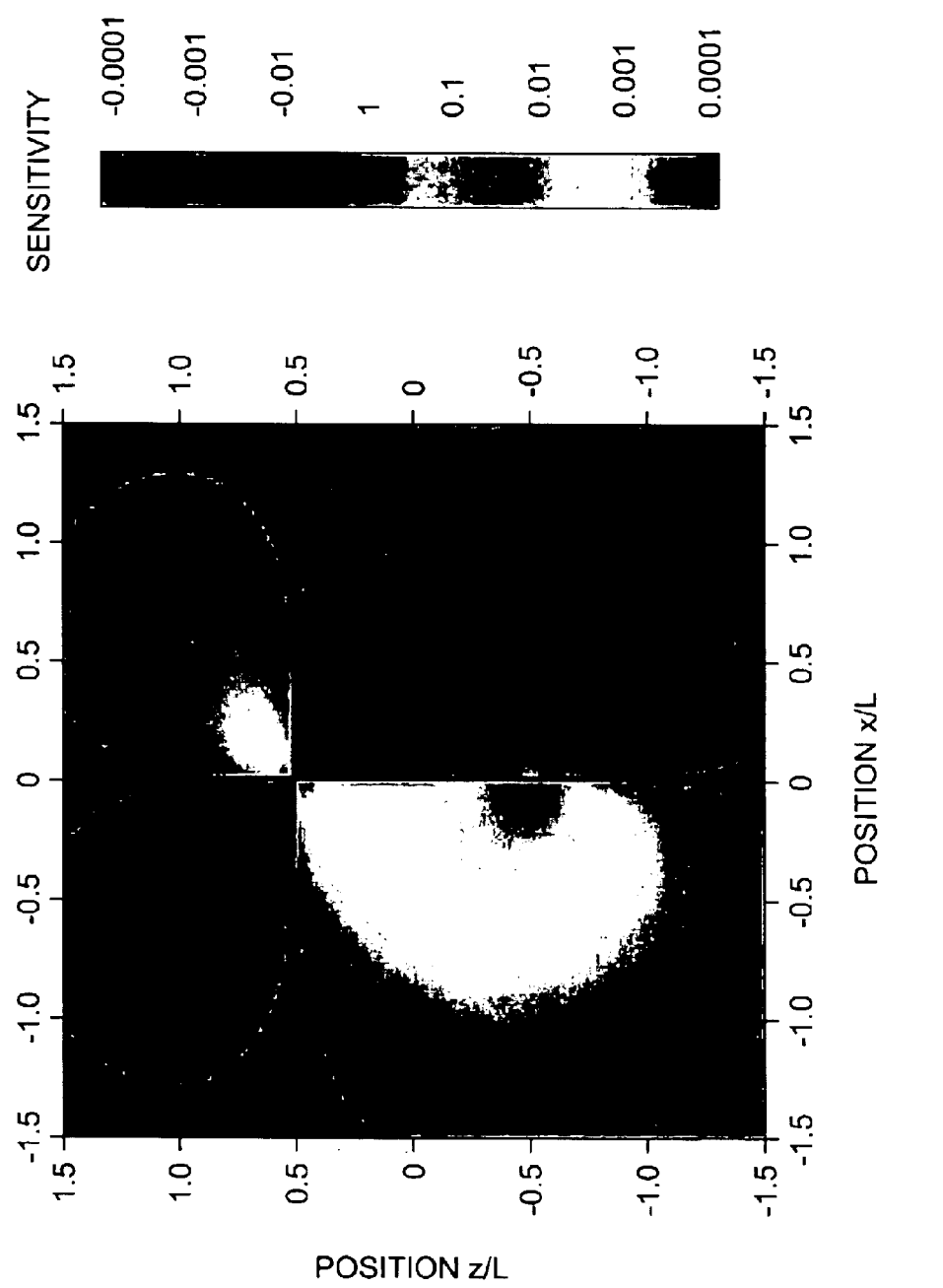
FIG. 17 is a density plot showing a three-dimensional sensitivity distribution in an X-Z plane for a tubular of the invention having a transverse (90° tilted) transmitter antenna and an axial receiver antenna.

Turning to FIG. 15, a simulated three-dimensional sensitivity distribution is shown for an embodiment of the invention. The density plot of FIG. 15 was calculated for a tubular having transmitter and receiver antennas with axes tilted at 45° relative to the longitudinal axis of the tubular (See FIG. 10a). FIG. 16 is a simulated three-dimensional sensitivity distribution for another embodiment of the invention. The density plot of FIG. 16 was calculated for a tubular having a transmitter antenna with a 45°-tilted axis and an axial receiver antenna (See FIG. 8). FIG. 17 is another simulated three-dimensional sensitivity distribution for another embodiment of the invention. The density plot of FIG. 17 was calculated for a tubular of the invention having a transverse transmitter antenna and an axial receiver antenna.

While the methods and apparatus of this invention have been described as specific embodiments, it will be apparent to those skilled in the art that variations may be applied to the structures and in the steps or in the sequence of steps of the methods described herein without departing from the concept and scope of the invention. For example, the tubulars of the invention may be configured with multiple transmitter and/or receiver antennas as desired. Cross-well monitoring may also be implemented between boreholes equipped with the tubulars of the invention. Non-metallic tubulars may also be used to implement the invention. All such similar variations apparent to those skilled in the art are deemed to be within this concept and scope of the invention as defined by the appended claims.

What is claimed is:

1. A tubular for monitoring subsurface reservoir characteristics in a directed orientation, comprising:

an elongated metallic body with a longitudinal axis for permanent disposal within a borehole traversing the reservoir;

a plurality of openings formed along the tubular wall to allow for passage of electromagnetic energy therethrough, the openings formed at an angle with respect to the longitudinal axis of the tubular and sealed to prevent fluid passage;

a groove formed about the external circumference of the tubular in alignment with the openings;

an antenna disposed on the exterior of the tubular within the groove such that its axis is tilted with respect to the axis of the tubular, the antenna adapted to transmit or receive electromagnetic energy;

wherein the antenna is disposed on the tubular such that the antenna is perpendicular to the tubular openings at intersections of the antenna and openings; and the tubular adapted for connection to another tubular to form a conduit for passage of subsurface fluids or gases through the reservoir.

2. The tubular of claim 1, wherein the reservoir characteristic is resistivity.

3. The tubular of claim 1, wherein the groove is formed at an angle with respect to the longitudinal tubular axis.

4. The tubular of claim 1, further comprising at least one opening formed in its wall parallel to the longitudinal axis of the tubular to allow for passage of a signal therethrough and sealed to prevent fluid passage.

5. The tubular of claim 1, wherein the openings are curved.

6. The tubular of claim 1, wherein a plurality of antennas are disposed on the exterior of the tubular and spaced from one another, each antenna adapted to transmit or receive electromagnetic energy.

7. The tubular of claim 6, wherein an antenna of the plurality of antennas is disposed on the tubular with its axis angled toward the axis of the antenna disposed within the groove.

8. The tubular of claim 1, wherein the antenna comprises a plurality of coils having non-parallel axes.

9. The tubular of claim 1, further comprising a wireline coupled to the antenna, the wireline adapted to carry a signal to or from the antenna.

10. The tubular of claim 1, wherein the groove comprises a plurality of antennas disposed therein, each antenna with its axis tilted with respect to the tubular axis and parallel to one another.

11. The tubular of claim 1, wherein the tubular comprises a plurality of antennas disposed within a plurality of grooves formed about the tubular external circumference, each antenna adapted to transmit or receive electromagnetic energy.

12. The tubular of claim 11, wherein each groove is aligned with a tubular section having a plurality of openings formed therein to allow for passage of electromagnetic energy through the tubular wall and sealed to prevent fluid passage.

13. The tubular of claim 11, wherein each groove is formed at an angle with respect to the longitudinal tabular axis.

14. The tubular of claim 13, wherein at least two grooves are angled toward one another.

15. The tubular of claim 13, wherein at least two grooves are uniformly parallel about the tubular circumference.

16. The tubular of claim 1, further comprising electronics to activate the antenna to transmit or receive electromagnetic energy in a selected orientation within the reservoir.

17. The tubular of claim 1, further comprising a shield disposed on the tubular over the antenna, the shield providing passage to electromagnetic energy.

18. The tubular of claim 1, wherein the groove is formed such that the openings lie substantially within the groove.

19. A method for monitoring subsurface reservoir characteristics in a directed orientation, comprising:

(a) permanently disposing a tubular within a borehole traversing the reservoir, the tubular having an elongated metallic body with a longitudinal axis and a plurality of openings formed along its wall to allow for passage of electromagnetic energy therethrough, the openings formed at an angle with respect to the tubular axis and sealed to prevent fluid passage, a groove formed about the external circumference of the tubular in alignment with the openings and having an antenna disposed therein such that its axis is tilted with respect to the tubular axis, the antenna adapted to transmit or receive electromagnetic energy and disposed on the tubular such that the antenna is perpendicular to the openings at intersections of the antenna and openings;

(b) using the tubular to form a conduit for passage of subsurface fluids or gases through the reservoir; and (c) activating the antenna to transmit or receive electromagnetic energy to determine a resistivity profile of the reservoir.

20. The method of claim 19, further comprising determining the movement of fluids or gases within the reservoir from the resistivity profile.

21. The method of claim 19, wherein step (c) includes activating the antenna to transmit or receive electromagnetic energy in a selected orientation within the reservoir.

22. The method of claim 19, wherein the groove is formed at an angle with respect to the longitudinal tubular axis.

23. The method of claim 19, wherein the tubular openings are curved.

24. The method of claim 19, wherein the antenna comprises a plurality of coils having non-parallel axes.

25. The method of claim 19, further comprising coupling a wireline to the antenna, the wireline adapted to carry a signal to or from the antenna.

26. The method of claim 19, wherein the groove comprises a plurality of antennas disposed therein, each antenna having its axis tilted with respect to the tubular axis and parallel to one another.

27. The method of claim 19, wherein the tubular comprises a plurality of antennas disposed within a plurality of grooves formed about the tubular external circumference, each antenna adapted to transmit or receive electromagnetic energy.

28. The method of claim 27, wherein each groove is aligned with a tubular section having a plurality of openings formed therein to allow for passage of electromagnetic energy through the tubular wall and sealed to prevent fluid passage.

29. The method of claim 19, further comprising disposing a shield on the tubular over the antenna, the shield providing passage to electromagnetic energy.

\* \* \* \* \*